United States Patent Office 3,756,921
Patented Sept. 4, 1973

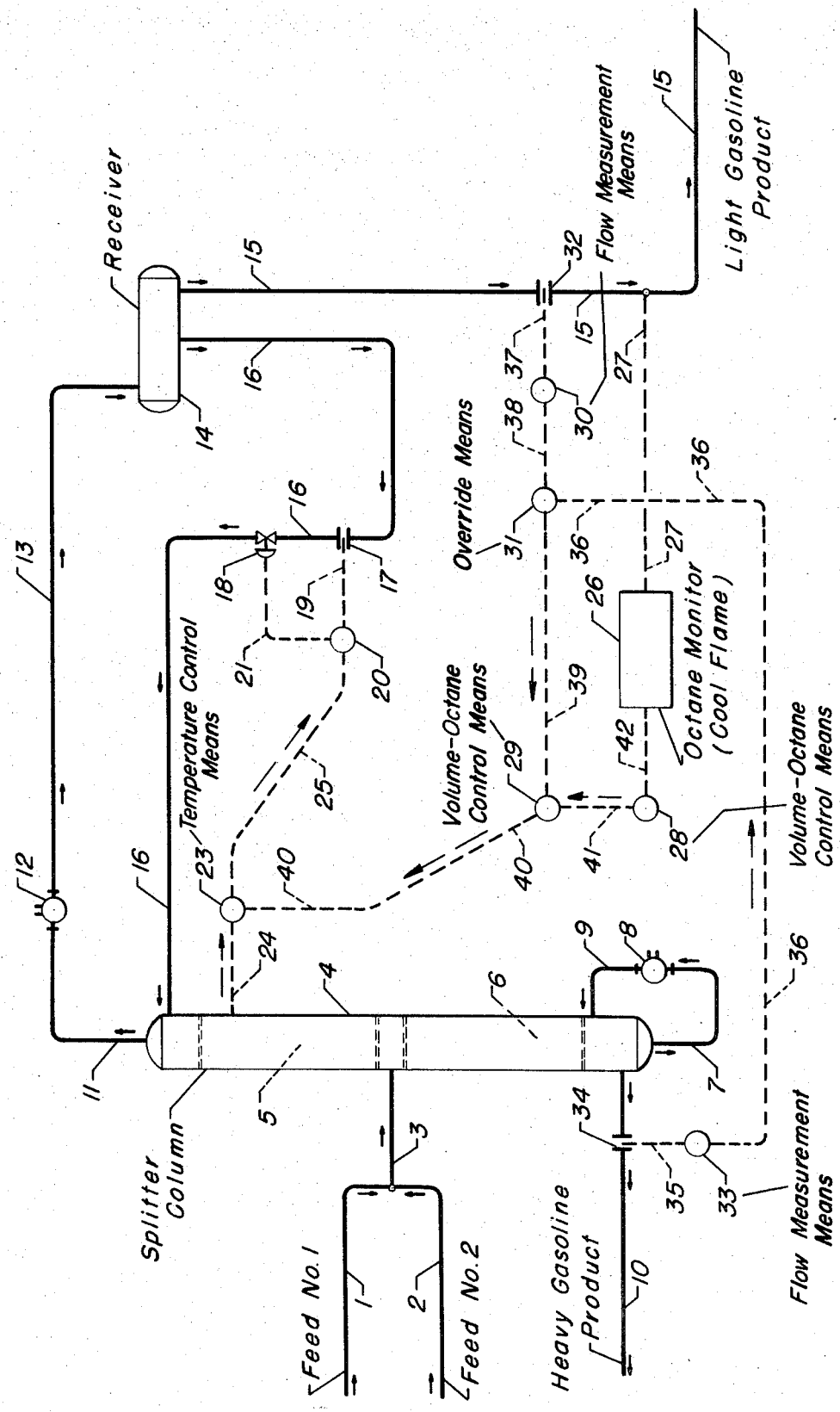

3,756,921
SPLITTER COLUMN OVERHEAD
Walter A. Bajek, Lombard, and James H. McLaughlin, La Grange, Ill., assignors to Universal Oil Products Company, Des Plaines, Ill.
Continuation-in-part of application Ser. No. 868,459, Oct. 22, 1969. This application Dec. 22, 1971, Ser. No. 210,942
The portion of the term of the patent subsequent to Mar. 7, 1989, has been disclaimed
Int. Cl. B01d *3/42;* C10g *7/00*
U.S. Cl. 196—132                                    8 Claims

ABSTRACT OF THE DISCLOSURE

This application discloses an overhead control system for a gasoline splitter column which utilizes an octane monitor in combination with flow measuring means on the bottom and overhead streams to produce a controlled overhead volumetric-octane yield. The bottoms flow rate means can override the overhead flow signal when excess quantities of bottoms are produced to prevent the column from emptying.

RELATED APPLICATIONS

This application is a continuation-in-part of our copending application Ser. No. 868,459, filed on Oct. 22, 1969, now Pat. No. 3,647,635. All of the teachings of said application are incorporated into this application by specific reference thereto.

BACKGROUND OF THE INVENTION

Field of the invention

The field of art to which this invention pertains is fractionation control. More specifically this invention relates to a process for controlling the overhead gasoline make on the basis of its octane number and the total flow output of overhead and bottoms streams.

Prior art

Prior art contains a multitude of patents relating to process control of fractionation columns. In particular the prior art utilizes octane monitors to modify and control fractionation column temperature to maintain constant gasoline octane number of the overhead stream.

The processes of our invention relates to a process control system in which the overhead octane number is controlled within certain maximal and minimal values along with the overhead flow rate to produce a maximum yield of overhead material. Specifically, our invention utilizes flow measuring means which measure the flow outputs of the overhead and bottoms streams and an onstream octane monitor which measures the overhead make octane number. Both the flow measuring devices and the octane monitor adjust the set point temperature of the reflux control loop to maintain a certain overhead column temperature and a preset volumetric-octane overhead yield for the most part.

SUMMARY OF THE INVENTION

Our invention may be summarized as a process control system for the reflux control loop in a gasoline splitter column. Specifically, our invention is a combination of an onstream octane monitor which operates in combination with flow measurement means on overhead and bottoms output streams to reset the set point temperature for the reflux control loop. The octane monitor and the overhead flow rate measuring means modify the set point temperature of the column by passing their output signals to a volume-octane control means. The control means resets the set point temperature. The bottoms flow rate measuring means passes a signal to an override means which can modify the overhead flow rate output signal passing through it and to the volume-octane control means to modify the overhead flow rate signal passing to the volume-octane control means when the bottoms flow rate is above or below certain preset values.

DESCRIPTION OF THE DRAWING

With reference now to the drawing, there is shown a gasoline splitter column 4 receiving a plurality of stabilized gasoline feeds. Splitter column 4 is a conventional continuous flow externally refluxed fractional distillation column containing from 10 to 50 or more vertically spaced vapor-liquid contacting stages as, for example, bubble decks, sieve decks, perforated trays or the like. Line 1 carries a Feed No. 1 comprising stabilized reformate from the stabilizer column of a naphtha reforming unit No. 1. Line 2 carries Feed No. 2 comprising stabilized reformate from the stabilizer column of a naphtha reforming unit No. 2. The combined reformates are charged to the column 4 via line 3 which connects with the column at a locus approximately midway in the height thereof. A plurality of vapor-liquid contact stages above this locus comprises the rectification zone 5 and a plurality of contact stages below the locus comprises the stripping zone 6 of the column.

The two reforming units are separate, independently operated catalytic naphtha reforming units; the details thereof form no part of the present invention, being conventional and well known in the art. A typical catalytic naphtha hydroreforming unit is described in U.S. Patent 3,296,118 (Class 208-100) to which reference may be had for specific information concerning flow arrangement, catalyst, conditions, etc. The feed to column 4 is generally under stabilizer reboiler level control from the preceding reforming units rather than direct flow control. Accordingly, the feed rate is usually, but not always, relatively constant, but it may be subject to some variation due to changes in naphtha feed composition, catalyst and/or operating conditions in either or both of the catalytic reforming unit reaction zones, or due to changes in operating conditions of the reforming unit stabilizer columns.

Gasoline splitter column 4 is maintained under operating conditions sufficient to separate the combined reformate feed stock into an overhead gasoline fraction having an end boiling point of about 400° F. and a bottoms fraction comprising heavy hydrocarbon constituents of the combined reformate feed having a boiling range of from about 400° F. to about 550° F., or even higher. While the refiner will typically set control of splitter column 4 to produce an overhead fraction having an end point of about 400° F., this is only a secondary consideration. The primary consideration is normally to produce an overhead fraction having an octane number of predetermined value, and this octane number is the primary control for operation of the column 4. Any deviation of octane number will require a compensating deviation of endpoint in order to produce an overhead product of constant octane number.

In order to accomplish the desired separation, the gasoline splitter column 4 will contain the rectification zone 5 and the stripping zone 6, as indicated hereinabove, in order that the most effective and efficient separation of hydrocarbon constituents may be accomplished within the fractionating column. In addition to the rectification and stripping zones, the column is provided with a reboiling section for heat input, and an overhead section which provides reflux liquid in a manner which shall be set forth hereinafter.

The reboiler section of factionating column 4 comprises a reboiler liquid line 7, a reboiler heat exchanger 8, and a reboiler vapor return line 9 which are of conventional construction and design. Conventional instrumentation, not shown, is provided to control the heat input to the reboiler system. In addition, gasoline splitter column 4 is provided with a bottoms fraction draw-off line 10, whereby the heavy gasoline product may be withdrawn and sent to storage or to other processing.

The desired gasoline constituents of the combined reformate feed which is introduced into splitter column 4, are withdrawn in a vapor phase from column 4 via line 11 and passed to a heat exchanger 12 wherein they are condensed and cooled to about 100° F. or less. The condensed and cooled gasoline fraction passes from the heat exchanger 12 via line 13 into a fractionator overhead receiver 14 which is typically maintained at a pressure of from about 5 to 100 p.s.i.g., or more, in order to maintain low boiling constituents within the liquid phase. The liquid accumulated in the overhead receiver 14 is separated into two portions. A first portion is withdrawn via line 15 as a light gasoline product and sent to storage facilities, not shown. This light gasoline product typically will have a boiling range of from about $C_5$ to about 400° F. as indicated by ASTM Method D–86.

The second portion of the condensed overhead is withdrawn from the overhead receiver 14 via line 16 as the reflux which is returned to the column 4 in order to maintain the proper degree of vapor rectification within zone 5. The reflux conduit 16 also contains therein a flow measuring means such as an orifice 17 and a flow controlling means such as control valve 18. The reflux flow rate is regulated by a flow control loop comprising the orifice 17, a flow signal line 19, a flow controller 20, a controller output line 21, and the control valve 18. The set point of flow controller 20 is adjustable.

A temperature controller 23, also provided with an adjustable set point (set point temperature), senses and controls the rectification zone temperature as detected by a thermocouple or other sensing means 24 located within the rectification zone at a locus below the reflux inlet of the column. The resulting temperature output signal is transmitted from the temperature controller 23 via controller output line 25 to adjust or reset the setpoint of flow contoller 20.

Octane monitor 26, utilizing a stabilized cool flame generator with servo-positioned flame front, is field-installed adjacent column 4. In a preferred embodiment, the flows of oxidizer (air) and fuel (gasoline sample) are fixed as in the induction zone temperature. Combustion pressure is the parameter which is varied in a manner to immobilize the stabilized cool flame front. Upon a change in sample octane number, the change in pressure required to immobilize the flame front provides a direct indication of the change in octane number. Typical operating conditions for the octane monitor are:

Air flow—3500 cc./min. (STP)
Fuel flow—1 cc./min.
Induction zone temperature—700° F. (research octane); 800° F. (motor octane)
Combustion pressure—4–20 p.s.i.g.
Octane range (max.)—80–102*

*The actual calibrated span of the octane monitor as here utilized will, in general, be considerably narrower. For example, if the target octane is 95 clear (research method), a suitable span may be 92–98 research octane. When a relatively narrow span is employed, the change in octane number is essentially directly proportional to the change in combustion pressure.

Dashed line 27 represents a suitable sampling system to provide a sample of column overhead to the octane monitor. For example, the sampling system 27 may comprise a sample loop taking the light gasoline product at a rate of 100 cc. per minute from a point upstream of a control valve and returning it to a point downstream from the control valve, the sample itself being drawn off from an intermediate portion of the sample loop and injected at a controlled rate by a metering pump to the combustion tube of the octane monitor. The octane monitor output signal is transmitted via line 42 to the means 28 which transfers the octane monitor output signal to volume octane control means 29. Means 28 may be an amplifier or a converter or a line which just transfers the octane monitor signal.

In splitting reformates to make various boiling range fractions, it is generally found that the octane number of the heavy gasoline product which is withdrawn via line 10 is consistently higher than the octane number of the light gasoline product which is withdrawn via line 15. This correlation of octane number with gasoline fraction is found to occur even when as little as 5 volume percent or as much as 60 volume percent of the reformate gasoline is removed as a bottoms product via line 10.

Thus, when operating column 4 on a reformate feed stock, any decrease in the measured octane number of the overhead product, below a minimum value at a constant overhead make indicates that an insufficient amount of heavy boiling gasoline components is being withdrawn as a portion of the overhead product. In order to compensate for this condition, the volume-octane control means 29 will reset the temperature setpoint in an upward direction to increase the rectification zone temperature in order to include a greater portion of the high octane number heavy ends in the overhead vapor which leaves column 4 via line 11. Temperature controller 23, being reset by the volume-octane control means, will then call for a decrease in reflux flow which in turn will be effected by flow controller 20 and control valve 18.

Again, when operating column 4 on a reformate feed stock, an increase in the measured octane number of the overhead product above a maximum value at constant overhead make is an indication that an excess of high octane number heavy ends is being withdrawn from column 4 in the overhead fraction. The volume-octane control means 28 therefore will reset the temperature setpoint in a downward direction for a decrease in the rectification zone temperature in order to eliminate a greater portion of the heavy ends from the overhead vapor. Temperature control means 23 being reset by the volume-octane control means will call for an increase in the reflux flow which in turn will be effected by flow controller 20 and control valve 18.

The same of course will occur when the octane number of the overhead remains constant but the rate of overhead make changes. When the flow rate of overhead decreases, the flow measuring means 32 senses the decrease and changes the output signal from transfer means 30 which passes via lines 38 and 39 to the volume-octane control means 29. The means 29 then senses a decrease in the product of the octane and overhead flow rate signals and accordingly increases the temperature setpoint of the temperature control means 23. More overhead is produced and the temperature setpoint is eventually stabilized. Should the overhead flow rate increase at constant octane the temperature setpoint will be reduced.

In instances where the product of overhead octane and flow rate is constant but the bottom flow rate has exceeded a preset maximum value the override means 31 will modify the signal passing via line 38 through it to line 39 and to the volume-octane control means, to cause the temperature setpoint to be increased driving more of the bottoms overhead. When the bottom flow rate is back within normal limits the override will cut out and the volume-octane controller 29 will again function as a time control means.

When the opposite situation occurs, the bottoms flow rate is below a preset minimum value, then the override means 31 will again modify the overhead flow rate output signal transmitted via line 39 to volume-octane controller 29 to cause the temperature set point to be reduced to allow more flow out of the bottoms. When the bottoms flow rate comes up to an acceptable level the override circuit stops modifying the overhead signal to the volume-octane control means. Overhead temperature control in the column is then returned to a volume-octane control basis off the overhead stream.

The use of the volume-octane control means 29 to control the overhead temperature offers advantages to the refiner who desires to produce a given pool octane product. The control means 29 varies the overhead temperature to maintain a constant overhead octane and flow rate product. The octane and the flow rate may vary but the barrel-octane will remain constant. Also in instances in which the octane number of the overhead is desired to be maintained within reasonable limits, there may be a similar override means which will prevent an extremely low octane overhead of sufficiently high quantity to yield poor overhead product. The overhead volume-octane control means 29 may have the octane limits programmed into it to maintain reasonable overhead octane variations or as mentioned above a separate overriding device may be used. It is preferred to use a maximum or minimum desired overhead octane to pervent large variances in the overhead product quality.

The maximum and minimum octane number values preferred when used are generally within the range of from about 85 to 100 research clear octane (RON). Even more preferred ranges are from about 90 to about 100 RON.

The maximum and minimum preset bottoms flow rate values can vary depending primarily on the feed stock passed into the column, if the feedstock contains a large quantity of heavy material the bottoms flow rate will be larger than if the feed contained lesser amounts of heavy components. Typically, the maximum and minimum bottoms flow rates will be within 5 to 25% of the difference between the feed and overhead flow rates.

Those skilled in the art realize, of course, that thermocouple 24 could be placed in locations other than that shown as, for example, in vapor outlet line 11. The drawing, however, illustrates a preferred embodiment wherein the temperature control means 23 senses and controls not the overhead vapor as it emerges directly from column 4, but rather the liquid or vapor temperature obtaining within the rectification zone at a point some distance below the reflux inlet of line 16 and above the feed inlet of line 3. In this preferred embodiment, the thermocouple 24 is typically located several trays (for example, 2–6 trays) below the reflux inlet of line 16. This arrangement will afford a more immediate detection of changing heavy ends concentration, at least several minutes before such heavy ends reach the overhead vapor line 11 to cause a change in the octane number of the overhead product.

While the double cascade arrangement illustrated in the drawing represents a preferred embodiment, it is within the scope of this invention to omit the temperature control means 23 and to reset flow controller 20 directly by the output signal directly from the volume-octane control means 29. In this instance the temperature control means as used in the claims would be the controller 20 and the temperature setpoint would be the temperature that the volume-octane control means 29 desires the overhead to operate at a yield a desired operation. Alternatively, the flow controller 20 could also be omitted in which case the volume-octane control means 29 would connect directly with valve 18. It may be expected, however, that elimination of either or both of the subloops will result in somewhat poor overall control because rectification zone temperature and reflux flow variations will become a source of additional upsets, and also because the relatively large time constant of the stabilizer column itself tends to make single loop control unstable.

The overhead flow rate through line 15 is measured by flow measurement means 30. This means utilizes a flow measurement device 32 which can be an orifice which generates a signal which is passed via line 37 to measurement means 30. Flow measurement means 30 generates an overhead flow rate output signal which passes via transmission means line 38 to override means 31. Override means 31 transmits a signal via means 39 to volume-octane control means 29 which eventually may reset the temperature-set point temperature control means 23.

The bottoms flow rate through line 10 is measured by flow measurement means 33 which is connected via line 35 to measurement device 34 which may be an orifice or any other type of apparatus which can generate an output signal responsive to flow rate. Device 34 and measurement means 33 may be combined and when combined can be referred to as a flow measurement means. A bottoms flow rate output signal passes via line 36 to override means 31.

The function of override means 31 is to prevent the total "dumping" of column 4 should the bottom draw off rate exceed a preset maximum value. Override means 31 also can modify the signal going to volume-octane control means 29 when the bottoms flow rate is below a certain value. In order to accomplish this the override generally has upper and lower limits which will function to control the signal transmitted to the volume-octane control means 29 via line 39.

Those skilled in the art realize, of course, that a gasoline splitter column such as column 4 does not always operate on a feed stock comprising reformate gasoline. In many instances splitter column 4 may operate to separate an overhead and a bottoms fraction from a gasoline feed stock which may comprise one or more gasolines such as cracked gasoline, natural gasoline, alkylate gasoline, etc., and the feed stock may comprise stabilized and unstabilized gasolines which may include debutanized, depentanized, and dehexanized gasolines. Thus, it is possible that there will be embodiments of operation wherein the heavy gasoline product withdrawn via line 10 will have an octane number which is consistently lower than the octane number of the light gasoline product withdrawn via line 15. In those instances, the octane monitor 26 will call for overall corrective action which will be the reverse of that which has been indicated hereinabove for operations on reformate feed stocks. That is to say, if the overhead product of line 15 indicates a decrease in the measured octane number, this would be an indication that an excessive amount of low octane heavy ends is being withdrawn overhead via line 11 and the control system would function to increase the amount of reflux in order to eliminate a greater portion of the heavy ends from the overhead vapor.

DETAILED DESCRIPTION OF THE INVENTION

The invention of this application is a process control application of the hydrocarbon analyzer described in U.S. Patent 3,463,613 filed by E. R. Fenske and J. H. McLaughlin, all the teachings of which, both general and specific, are incorporated by reference herein.

As set forth in U.S. Patent 3,463,613 the composition of a hydrocarbon sample can be determined by burning the sample in a combustion tube under conditions to generate therein a stabilized cool flame. The position of the flame front is automatically detected and used to develop a control signal which, in turn, is used to vary a combustion parameter, such as combustion pressure, induction zone temperature or air flow, in a manner to immobilize the flame front regardless of changes in composition of the sample. The change in such combustion parameter required to immobilize the flame following a change of sample composition is correlatable with such composition change. An appropriate read-out device connecting therewith may be calibrated in terms of the desired identifying characteristic of the hydrocarbon sample, as, for example, octane number. Such an instrument is conveniently identified as a hydrocarbon analyzer comprising a stabilized cool flame generator with a servo-positioned flame front.

The type of analysis effected thereby is not a compound-by-compound analysis of the type presented by instruments such as mass spectrometers or vapor phase chromatographs. On the contrary, the analysis is represented by a continuous output signal which is responsive to and indicative of hydrocarbon composition and, more specifically, is empirically correlatable with one or more conventional identifications or specifications of petroleum products such as Reid vapor pressure, ASTM or Engler distillation or, for motor fuels, knock characteristics such as research octane number, motor octane number or composite of such octane numbers.

For the purpose of the present application, the hydrocarbon analyzer is further limited to that specific embodiment which is designed to receive a hydrocarbon sample mixture containing predominantly gasoline boiling range components, and the output signal of which analyzer provides a direct measure of octane number, i.e. research octane, motor octane or a predetermined composite of the two octane ratings. For brevity, the hydrocarbon analyzer will be referred to in the following description and accompanying drawing simply as an "octane monitor."

An octane monitor based on a stabilized cool flame generator possesses numerous advantages over conventional octane number instruments such as the CFR engine or automated knock-engine monitoring systems. Among these are: elimination of moving parts with corresponding minimal maintenance and down-time; high accuracy and reproducibility; rapid speed of response providing a continuous, real-time output compatibility of output signal with computer or controller inputs; ability to receive and rate gasoline samples of high vapor pressure, e.g. up to as high as 500 p.s.i.g., as well as lower vapor pressure samples (5–250 p.s.i.g.). These characteristics make the octane monitor eminently suitable not only for an indicating or recording function, but particularly for a process control function wherein the octane monitor is the primary sensing element of a closed loop control system comprising 0, 1, 2 or more subloops connected in cascade.

The present invention has as its principal objective the direct control of octane number of a gasoline splitter column overhead stream. A typical gasoline splitter is an externally refluxed, multiple tray, fractional distillation column employed to separate the light ends and lower boiling normally liquid gasoline components from the higher boiling components. The feed to such a column may typically comprise a stabilized reformate from a catalytic naphtha hydroreforming unit. Such a reformate will contain $C_5$ and heavier hydrocarbon constituents, with the end point dependent upon the original end point of the naphtha fraction which was hydroreformed. For example, the reformate which is produced from a naphtha having a 390° F. end point will typically have an end point in the range of about 440–450° F. It is normal to fractionate such a reformate to remove the heavier hydrocarbon components. Components boiling at a temperature in excess of about 400° F. have a high octane number, but they are predominantly aromatic hydrocarbons which are precursors to gum formation during gasoline storage and they can cause excessive deposition of carbonaceous material in an automobile engine during combustion. The overhead stream from the gasoline splitter column will thus typically comprise hydrocarbons in the $C_5$ to 400° F. end point boiling range, and the bottoms stream from the column will comprise heavy hydrocarbon constituents boiling above 400° F. (As used herein, the term "end point" and the temperatures illustrated are those typically defined by laboratory distillation in accordance with ASTM Method D-86.)

By and large it has been the practice to operate such a column mostly "in the dark" so far as the octane number of the product overhead fraction is concerned. That is to say, the column overhead product is manually sampled perhaps once every eight hour shift or perhaps even only once a day. The samples are picked up and taken to the laboratory where the sample is run and the result is then transmitted back to the unit operator who, until then, has not been able to ascertain what change, if any, should have been made at the time the sample was taken. Therefore, to be on the safe side, the unit operator will usually run the gasoline splitter column with excessive heat input and with corresponding over-reflux whereby the overhead fraction of the stabilized reformate will actually be outside of product specifications with respect to octane number a good part of the time. This method of "blind" fractionator operation clearly increases the refiner's costs.

The control problem is further complicated by the not uncommon practice of using a single fractionation column to process more than one gasoline stream. For example, a single gasoline splitter column will often receive plural or combined feeds which are stabilized reformates from two or more independently operated catalytic naphtha reforming units. Or the splitter column may be operated on a gasoline feed comprising a mixture of stabilized reformate, cat cracked gasoline, natural gasoline, etc. An upset in the operation of a single such reformer (or other similar gasoline feed source) will carry through to the gasoline splitter and be reflected in off-specification product since the splitter column overhead product is no longer indicative of only the operation of a single reformer or other gasoline source. Continuously meeting octane number specification is, therefore, an exceedingly difficult and haphazard task when employing a single splitter column to handle such a plurality of gasoline streams.

In accordance with the present invention, the octane monitor comprising a stabilized cool flame generator with servo-positioned flame front is connected to receive a continuous sample of the splitter column overhead product. The output signal of the octane monitor, which can be, and preferably is, calibrated directly in terms of octane number, is utilized in conjection with the overhead flow rate signal to reset or adjust the rate of flow of reflux to the rectification section of the column so that the volume-octane number of the overhead stream can be controlled within certain limits.

The control system is clearly applicable to any distillation wherein a gasoline fraction is separated into an overhead containing the lower boiling components of the fraction and a bottoms containing the higher boiling components of the fraction, regardless of the distillation cut-point between the fractions. As used herein, the term "higher boiling components" refers to those hydrocarbon constituents which boil at a temperature above the distillation cut-point for the overhead fraction. Thus, if the fractional distillation is undertaken to produce an overhead gasoline having an endpoint of, say, 380° F., the higher boiling components will comprise the bottoms fraction of the distillation. And if the distillation is undertaken to dehexanize the gasoline feed, the higher boiling components comprise hydrocarbons having seven or more carbon atoms per molecule. Similarly, the term "lower boiling components" refers to those hydrocarbon constituents which boil at a temperature below the distillation cut-point.

Because there is a direct measurement and control of octane rating, this control system is to be distinguished from those prior art control systems wherein some composition property, such as percent aromatics or conductivity or dielectric constant, is measured and controlled, all of these latter properties being merely an indirect indication of octane rating which is only narrowly correlatable therewith. Such indirect correlation becomes invalid for any significant deviation from the design control point.

The control system of this invention is also to be distinguished from those prior art systems employing automated knock-engines as the octane measuring device. The instant octane monitor is compact in size, can be totally enclosed by an explosion-proof housing and therefore can be used in hazardous locations. In fact, it is normally field-installed immediately adjacent to the gasoline splitter column. A knock-engine, however, cannot be employed in hazardous locations and must therefore be situated remote from the sample point.

The sample transport lag or dead time of a close-coupled octane monitor is typically of the order of two minutes, and its 90% response time is another two minutes. This is a very good approach to an essentially instantaneous or real time output. By way of contrast, the transport lag alone of a knock-engine may be of the order of thirty minutes or more, which those skilled in the control system art will recognize to be a substantial departure from real time output. With the much dead time built into a closed loop, it is extremely difficult to achieve and maintain stability. The injection of an outside disturbance of any appreciable magnitude, in such a potentially unstable system, will often result in undampened cycling with the consequence that the system will have to be put on manual control.

In a broad embodiment, the present invention relates to a combination with a continuous flow, fractional distillation column, the feed to which comprises a gasoline fraction, the overhead from which comprises the lower boiling components of said fraction and the bottoms from which comprises the higher boiling components of said fraction, said column including a rectification zone having a reflux conduit means in communication therewith at a first locus and means to supply reflux to said reflux conduit means, a control system for said column comprising:

(a) Means operatively associated with said reflux conduit means to vary the flow of reflux to said rectification zone in response to a temperature setpoint;

(b) A hydrocarbon analyzer comprising a stabilized cool flame generator with a servopositioned flame front receiving a sample of said column overhead and developing an overhead octane output signal which provides a measure of sample octane number of said overhead;

(c) Means transmitting said overhead octane output signal to a volume-octane control means;

(d) Flow measurement means associated with the overhead stream to measure the flow rate of overhead make and produce an overhead flow rate output signal;

(e) Flow measurement means associated with the bottoms stream to measure the flow rate of bottoms make and produce a bottoms flow rate output signal; and (f) Means transmitting said overhead flow rate output signal through an override means and to said volume-octane control means, said control means adjusting said temperature setpoint in response to the product of said overhead octane and a signal received from said override means;

(g) Means transmitting said bottoms flow rate output signal to said override means which override means modifies the signal received by said volume-octane control means from said means transferring said overhead flow rate output signal to increase said setpoint temperature when said bottoms flow rate is above a preset maximum value and to decrease said setpoint temperature when said bottoms flow rate is below a preset minimum value.

We claim as our invention:

1. In combination with a continuous flow, fractional distillation column, the feed to which comprises a gasoline fraction, the overhead from which comprises the lower boiling components of said fraction and the bottoms from which comprises the higher boiling components of said fraction, said column including a rectification zone having a reflux conduit means in communication therewith at a first locus and means to supply reflux to said reflux conduit means, a control system for said column comprising:

(a) means operatively associated with said reflux conduit means to vary the flow of reflux to said rectification zone in response to a temperature setpoint;

(b) a hydrocarbon analyzer comprising a stabilized cool flame generator with a servopositioned flame front receiving a sample of said column overhead and developing an overhead octane output signal which provides a measure of sample octane number of said overhead;

(c) means transmitting said overhead octane output signal to a volume-octane control means;

(d) flow measurement means associated with the overhead stream to measure the flow rate of overhead make and produce an overhead flow rate output signal;

(e) flow measurement means associated with the bottoms stream to measure the flow rate of bottoms make and produce a bottoms flow rate output signal; and (f) means transmitting said overhead flow rate output signal through an override means and to said volume-octane control means, said control means adjusting said temperature setpoint in response to the product of said overhead octane and a signal received from said override means;

(g) means transmitting said bottoms flow rate output signal to said override means which override means modifies the signal received by said volume-octane control means from said means transferring said overhead flow rate output signal to increase said setpoint temperature when said bottoms flow rate is above a preset maximum value and to decrease said setpoint temperature when said bottoms flow rate is below a preset minimum value.

2. The system of claim 1 wherein the feed to said column comprises at least one stabilized gasoline fraction.

3. The system of claim 1 wherein said reflux flow varying means comprises a flow control loop including a flow controller having an adjustable setpoint regulating the rate of flow of reflux through said reflux conduit means, said setpoint being adjusted in response to said temperature setpoint.

4. The system of claim 3 further characterized in the provision of means to sense the temperature in said column at a second locus, temperature control means, having said temperature stepoint, connecting with said temperature sensing means and developing a temperature output signal, and means transmitting the last-mentioned output signal to the setpoint of said flow controller, said volume-octane control means adjusting said temperature setpoint.

5. The system of claim 4 wherein said temperature sensing means is located in said rectification zone.

6. The system of claim 5 wherein said second locus is below said first locus.

7. The system of claim 6 wherein said distillation column contains a plurality of fractionation trays and said temperature sensing means is located several trays below said first locus.

8. The system of claim 1 wherein said temperature setpoint is increased when said product is below a preset value and decreased when said product is above a preset value, when said bottoms flow rate is below said preset maximum value and above said preset minimum value.

References Cited
UNITED STATES PATENTS

| | | | |
|---|---|---|---|
| 3,647,635 | 3/1972 | Bajek et al. | 196—132 |
| 3,428,528 | 2/1969 | Oglesby | 203—1 |
| 3,296,097 | 1/1967 | Lupfer | 203—2 |
| 3,361,646 | 1/1968 | MacMullan et al. | 203—2 X |
| 3,475,287 | 10/1969 | De Graff | 203—1 X |
| 3,619,377 | 11/1971 | Palmer et al. | 203—1 |

NORMAN YUDKOFF, Primary Examiner

D. EDWARDS, Assistant Examiner

U.S. Cl. X.R.

202—160; 203—1, 2, 3, DIG. 18; 208—DIG. 1